Nov. 26, 1968 J. L. E. BALDWIN ETAL 3,413,414

TELEVISION FRAME SYNCHRONIZING APPARATUS

Filed April 9, 1965 5 Sheets-Sheet 1

INVENTORS
JOHN LEWIS EDWIN BALDWIN
JOHN DAVID MILLWARD
BY
Haane and Nydick
ATTORNEYS INVENTORS
JOHN LENIS EDWIN BALDWIN
JOHN DAVID HILLWARD
BY
Hane and Nydick
ATTORNEYS Nov. 26, 1968 J. L. E. BALDWIN ET AL 3,413,414

TELEVISION FRAME SYNCHRONIZING APPARATUS

Filed April 9, 1965 5 Sheets-Sheet 3

INVENTORS
JOHN LEWIS EDWIN BALDWIN
JOHN DAVID MILLWARD
BY
Hane and Nydick
ATTORNEYS INVENTORS
JOHN LEWIS EDWIN BALDWIN
JOHN DAVID MILLWARD
BY
Haune and Nydick
ATTORNEYS

TELEVISION FRAME SYNCHRONIZING APPARATUS

Filed April 9, 1965 5 Sheets-Sheet 5

INVENTORS
JOHN LEWIS EDWIN BALDWIN
JOHN DAVID MILLWARD
BY
Hane and Nydick
ATTORNEYS United States Patent Office 3,413,414

Patented Nov. 26, 1968

3,413,414

TELEVISION FRAME SYNCHRONIZING APPARATUS

John Lewis Edwin Baldwin, Croydon, Surrey, and John David Millward, Orpington, Kent, England, assignors to Rank-Bush Murphy Limited Filed Apr. 9, 1965, Ser. No. 446,930
Claims priority, application Great Britain, Apr. 13, 1964, 15,101/64
9 Claims. (Cl. 178—69.5)

ABSTRACT OF THE DISCLOSURE

A television synchronizing apparatus for producing a predetermined phase relation between two sets of television synchronizing signals in which individual sources for first and second television synchronizing signals comprise horizontal frequency and vertical frequency components and define alternate odd-line and even-line fields. Voltage controlled phasing means vary the relative phases of the signals, and sample means generate a control voltage representing the value of an applied signal at instants fixedly related in time to controlling pulse signals. A sawtooth voltage wave repetitive at half the frequency of the vertical synchronizing component and having a predetermined rate of rise is generated by a sawtooth generator in response to an applied synchronizing signal. The vertical synchronizing component is used for synchronizing the generator producing the sawtooth voltage wave which is then applied to the sampling means. The sampling means, in turn, are controlled by applying the second vertical synchronizing component thereto.

Figure 1:
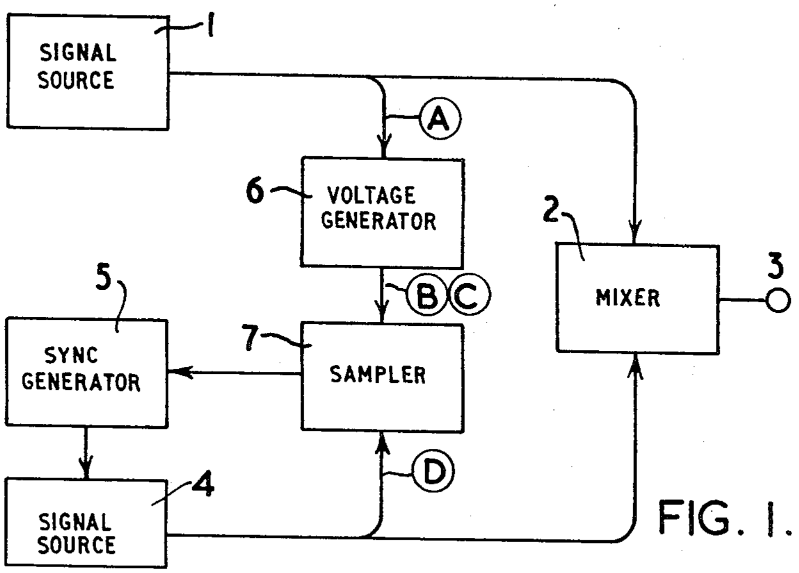

This invention relates to synchronizing arrangements for television apparatus and is especially concerned to provide improved means for ensuring frame synchonism between two sources of television video signals. In the operation of television systems it is frequently required to be able to mix signals derived from sources which are not synchronized from the same synchronizing signals generator and are therefore liable to differ in phase. When signals from such separate sources are to be combined or used in alternation in a single programme it is necessary to ensure that the signals are correctly synchronized, both in line and in frame. This is conveniently arranged by comparing the phases of the two sets of synchronizing signals and appropriately adjusting the phase of the synchronizing signals driving one picture signal source until the two sets of synchonizing signals are identical in phase. It is obviously desirable that both the line and field synchronizing signals of the two signals shall be correctly timed, so that odd-line and even-line fields occur simultaneously in the two signals. The present invention provides improved means for ensuring correct frame synchronism between two sets of television synchronizing signals.

It is an object of the present invention to provide television synchronizing apparatus providing a predetermined phase relation between two sets of television synchronizing signals.

It is also an object of the present invention to provide television synchronizing apparatus useful for producing synchronization of a television signal reproduced from a record thereof with a master synchronizing generator.

It is a further object of the present invention to provide television synchronizing apparatus for rapidly producing field synchronism between two sets of television synchronizing signals.

Television synchronizing apparatus according to the invention may comprise the combination of individual sources of first and second televsion synchronizing signals comprising horizontal frequency and vertical frequency components and defining alternate odd-line and even-line fields; voltage controlled phasing means varying the relative phases of said signals; sampling means operating to develop a control voltage representing the value of an applied signal at instants fixedly related in time to controlling pulse signals, sawtooth generator means developing in response to an applied synchronizing signal a sawtooth voltage wave repetitive at half the frequency of said rate of rise; circuit means applying first said vertical synchronizing component to synchronize said sawtooth generator; circuit means applying said sawtooth voltage wave to said sampling means; circuit means applying said second vertical synchronizing component to control said sampling means; and circuit means applying said control voltage to said phasing means.

A more specific embodiment of television synchronizing apparatus according to the invention may comprise in combination individual sources of first and second synchronizing signals including components repetitive at vertical and at horizontal frequency and defining alternate odd-line and even-line fields; voltage-controlled phasing means varying the relative phases of said signals; first pulse generator means generating in response to an applied vertical synchronizing signal first pulses predeterminedly timed with respect to those of said vertical signals preceding odd-line fields; second pulse generator means generating in response to an applied vertical synchonizing signal second pulses predeterminedly timed with respect to those of said vertical signals preceding even-line fields; circuit means applying said first vertical component alike to said first and second pulse generator means, third pulse generator means generating in response to an applied vertical synchronizing signal third pulses predeterminedly timed with respect to those of said vertical signals preceding a predetermined one of said odd-line and even-like fields; first waveform generator means developing in response to applied pulses first waveform portions of predetermined polarity said waveform portions having a first predetermined rate of rise during the intervals between said pulses; circuit means applying to said first waveform generator those of said first and second pulses timed with respect to vertical pulses preceding the other of said fields; second waveform generator means developing in response to applied pulses waveform portions having during said pulses a second predetermined rate of rise greater than said first rate; circuit means applying to said second waveform generator the remaining ones of said first and second pulses; adder means combining applied signals to form a composite output signal, circuit means applying said first and second waveform portions to said adder; sampling means controlled by applied pulses and by an applied voltage waveform to develop a control voltage representing the value of said applied voltage waveform during the occurrence of said pulses; circuit means applying said composite signal from said adder to said sampling means; circuit means applying said third pulses to control said sampling means and circuit means applying said control voltage to said phasing means.

In another form of apparatus according to the invention the second waveform gemerator means may operate to develop in response to said applied pulses a sawtooth voltage waveform comprising flyback portions occurring during said pulses, said flyback portions having said second predetermined rate of rise, and comprising stroke portions intervening between said flyback portions, said stroke portions being opposite in polarity to said first waveform portions.

In this embodiment of the invention the waveform generator may include a capacitor the charge on which is arranged to be changed at a first rate during the intervals between those of said first or second sets of pulses which are derived from synchronizing signals of one kind except for those periods in which pulses of the other set of said first and second sets occur during which periods the charge is changed in the same sense at a second rate. In addition the charge on said capacitor is arranged to be returned to an initial value during said derived pulses.

Figure 2:
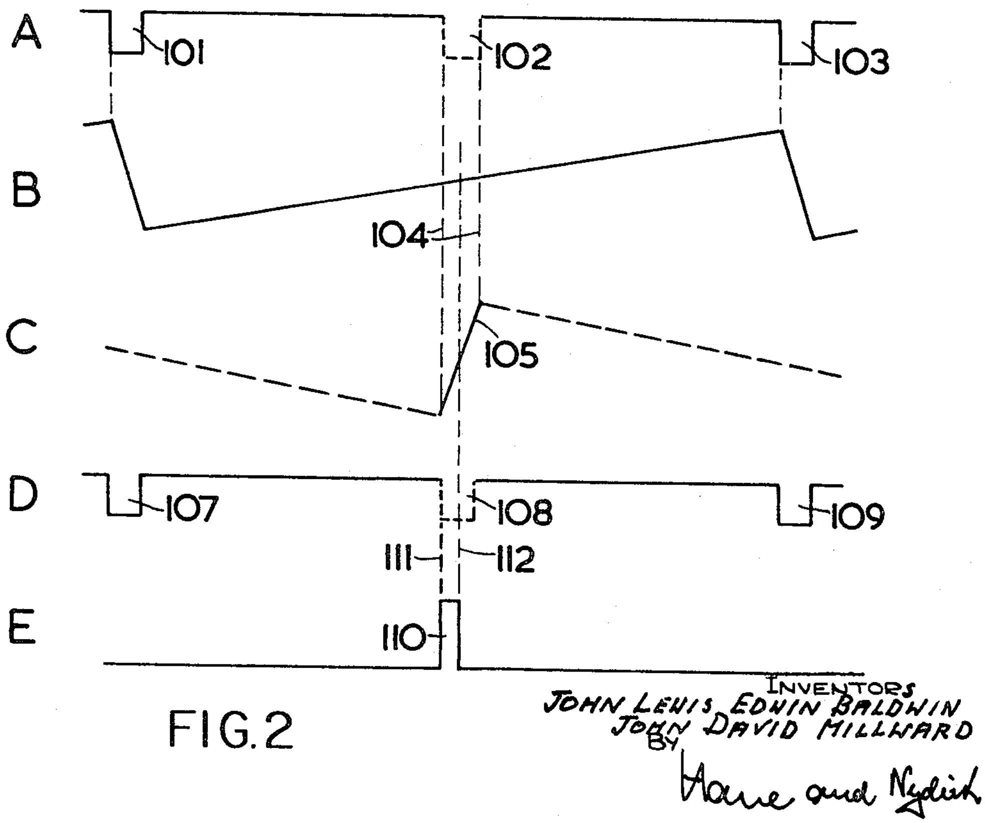
Figure 3:
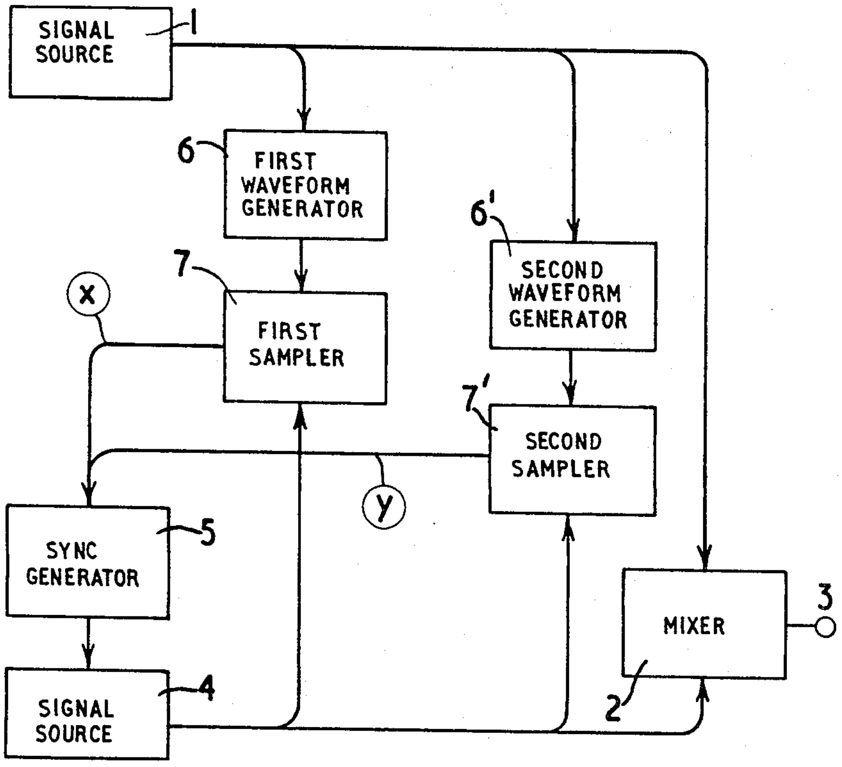
Figure 4:
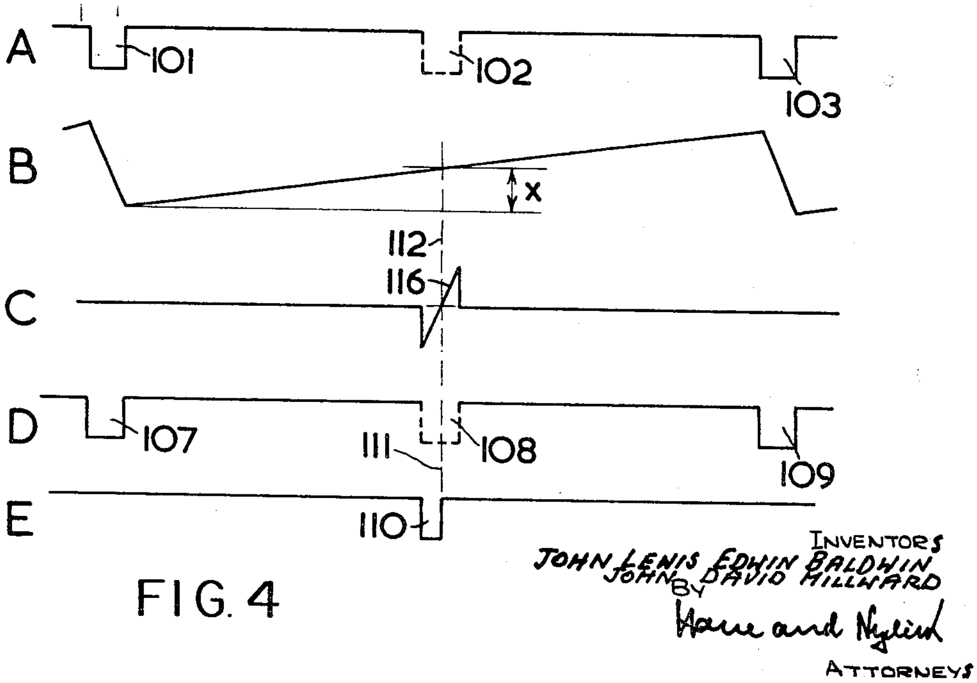
Figure 5:
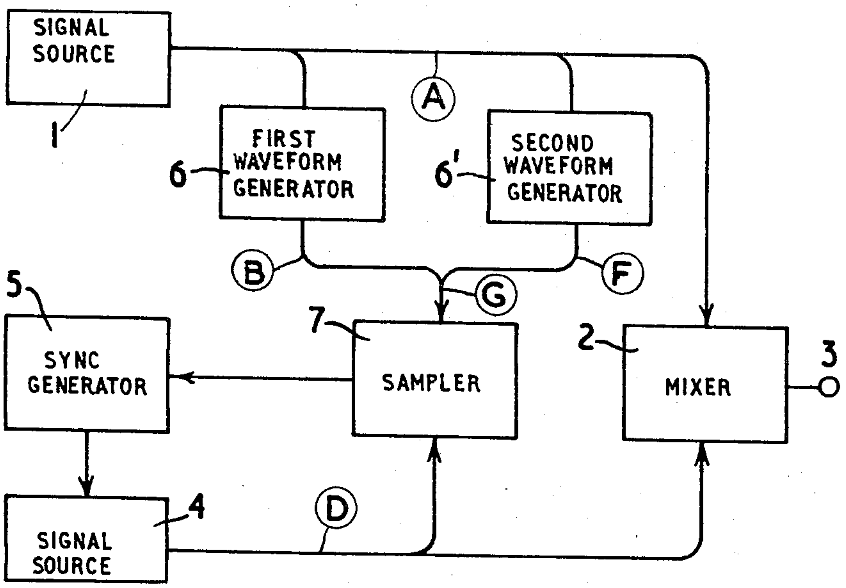
Figure 6:
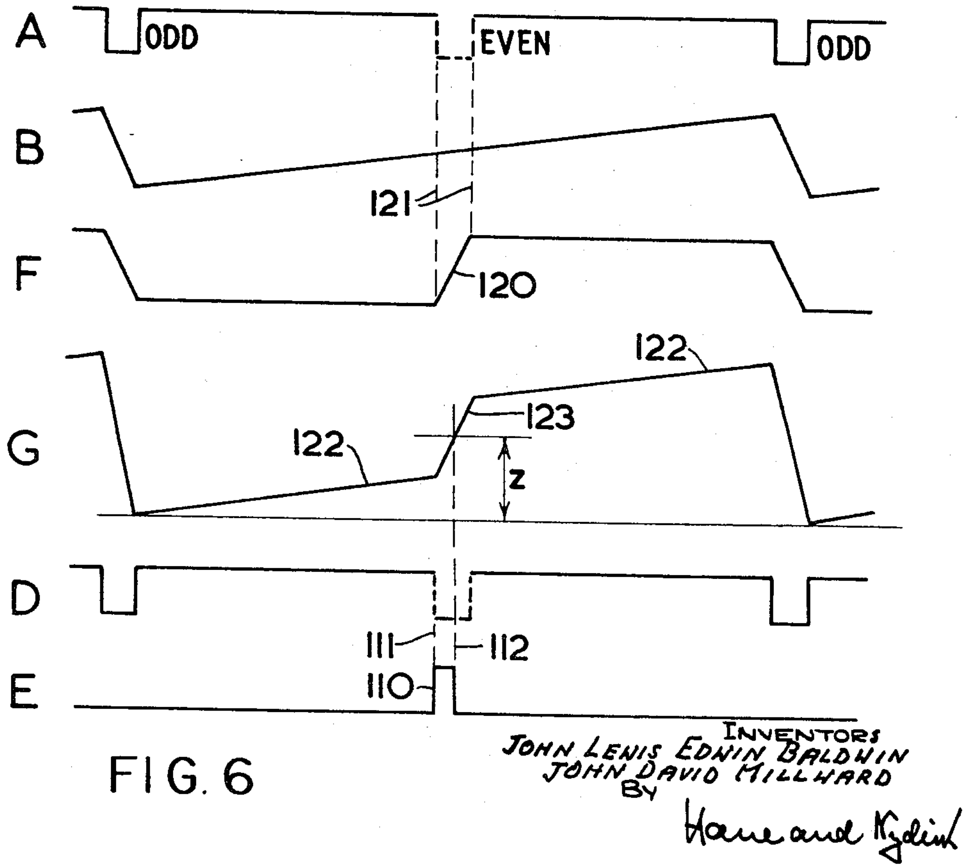
Figure 7:
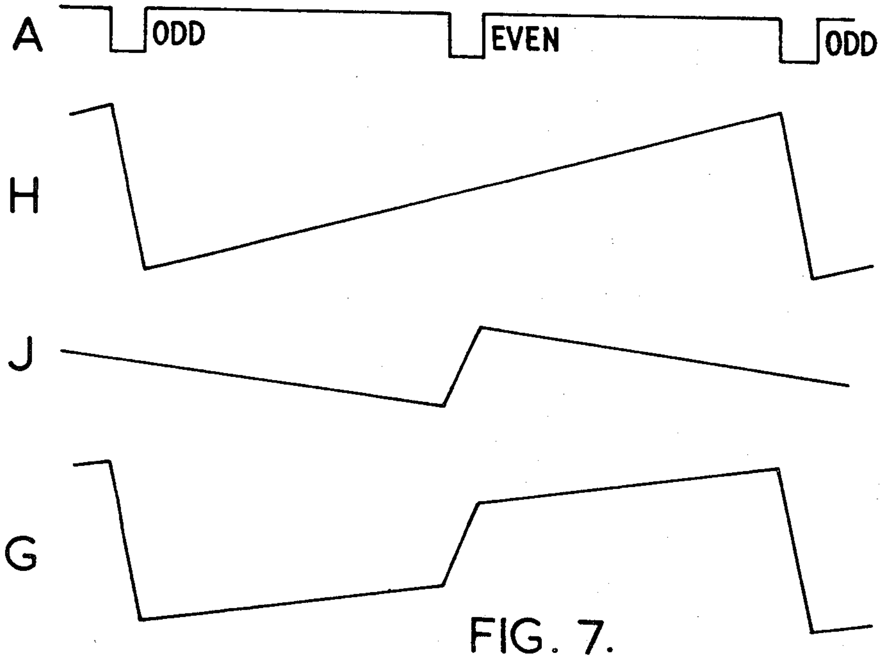
Figure 8:
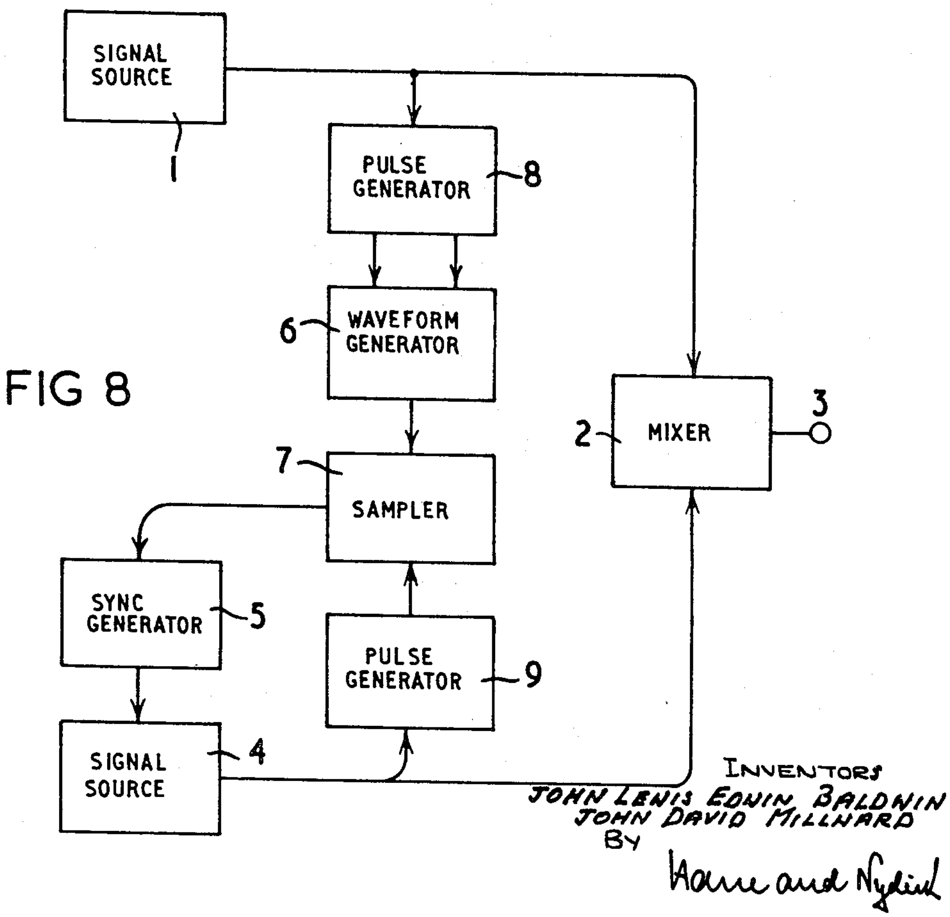
Figure 9:
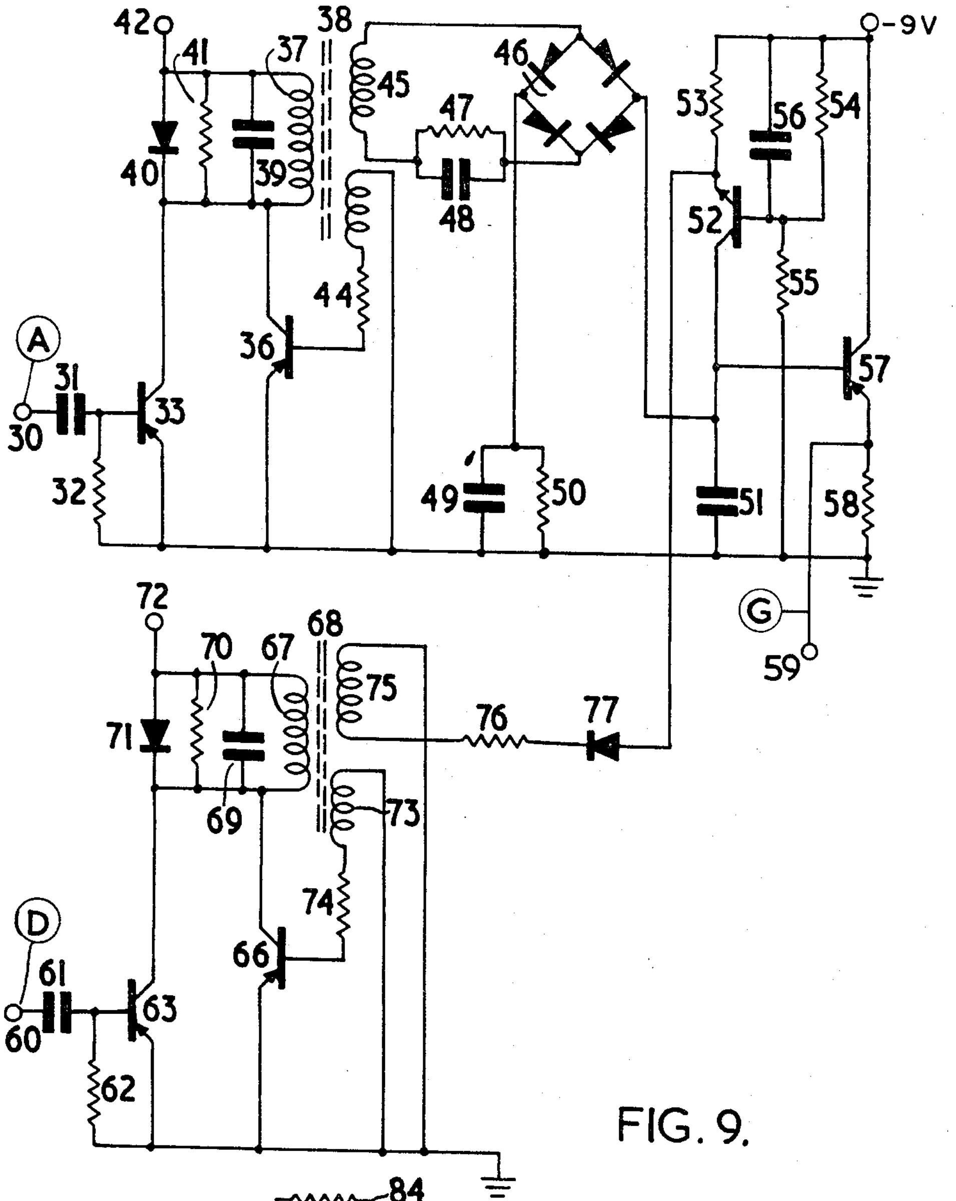
Figure 10:
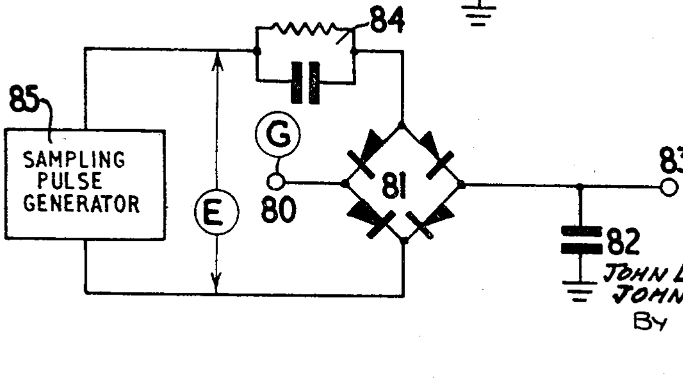

The features of the invention which are believed to be novel are recited with particularity in the appended claims. The invention, together with further features and advantages thereof, is best understood from the following description taken in conjunction with the accompanying drawings, in the several figures of which like elements are denoted by like reference numerals and in which:

FIGURE 1 is a block schematic diagram of means in accordance with the invention for producing a predetermined phase relation between two sets of television synchronizing signals, FIGURE 2 comprises a series of waveform diagrams illustrating the operation of the apparatus described in relation to FIGURE 1, FIGURE 3 is a block schematic diagram of apparatus for carrying out one embodiment of the present invention, FIGURE 4 is a series of waveform diagrams illustrating the operation of the apparatus described in relation to FIGURE 3, FIGURE 5 is a block schematic diagram of another embodiment of the invention, FIGURE 6 is a series of waveform diagrams illustrating the operation of the embodiment described in relation to FIGURE 5, FIGURE 7 is a series of waveform diagrams illustrating the operation of another embodiment of the invention, FIGURE 8 is a block schematic diagram illustrating yet another embodiment of the invention, and FIGURES 9 and 10 are circuit diagrams illustrating circuit arrangements which may be used in carrying out the invention according to one embodiment.

In FIGURE 1, television signals from a signal source 1, which is assumed to include a television synchronizing signal generator, are fed to a mixer circuit 2 whence they may be applied to an output terminal 3 either in combination with or in alternation with other television signals from a further source 4. Signal source 4 is associated with an external source of synchronizing signals represented by sync. generator 5. In order to ensure that the two signals arriving at mixer 3 may be combined or used in alternation without the appearance of difficulties due to the lack of synchronism between the two signals, the synchronizing signal components of the two television signals are, in generally known manner, compared in phase in a comparator to derive a control voltage which is applied to control the phase of the synchronizing signals produced by sync. generator 5 so as to produce the required state of synchronization. It will be apparent to those skilled in the art of television that signal source 4 and sync. generator 5 may in practice comprise a single apparatus for reproducing television signals previously recorded upon magnetic tape.

The comparator employed in carrying out the invention to detect phase differences between the synchronizing signal components of the two television signals may take the general form discussed below. Signals from source 1 are applied to a voltage generator 6 which develops from the synchronizing signal component of the applied signal a sawtooth voltage, illustrated by diagram B of FIGURE 2, which has a first rate of rise and is of frame periodicity, as may be seen by comparison with diagram A of FIGURE 2 which illustrates the field synchronizing component of the television signal from source 1. Here field pulses preceding odd-line fields are shown in solid line, at 101, 103, that preceding an even-line field is shown in broken line at 102. Voltage generator 6 also develops a recurrent voltage having a second higher rate of rise timed, as indicated by broken lines 104 to coincide with field synchronizing pulses preceding even-line fields in the signal derived from source 1. These portions of the signal are shown at 105 in waveform C of FIGURE 2, the remainder of this signal is indicated by broken line at 105, 106, for it may be of numerous forms as discussed below.

The waveform components developed by voltage generator 6 are applied to a sampler 7 in which they are sampled at intervals fixedly timed in relation to those field pulses of the signal produced by source 4. This signal which is illustrated by waveform D of FIGURE 2 will be seen to comprise odd-line pulses 107, 109 shown in full line and an even-line pulse 108 shown in broken line. Waveform E represents the pulse 110 employed to control the sampling action taking place in sampler 7. It will be seen that, as denoted by broken line 111, sampling pulse 110 is initiated by the leading edge of pulse 108. The sampling action is controlled by the trailing edge of sampling pulse 110 and, as indicated by vertical broken line 112, takes a sample of both component B and component C and combines these samples to form a control voltage. The control voltage produced by sampler 7 is applied to sync. generator 5 to control the signal from source 5 so as to produce a desired phase relation between the television signals arriving at mixer 2 from signal sources 1 and 4.

FIGURE 3 shows a block diagram of an embodiment of the invention in which as in FIGURE 1 signals from sources 1 and 4 fed by way of a mixer 2 to an output terminal 3. Here the means used in accordance with the invention to develop a control voltage for application to sync. generator 5 consists of a first waveform generator 6 developing the signal shown in FIGURE 4B, that is, a sawtooth signal having frame periodicity. This signal is sampled at a time indicated by vertical broken line 105 in a first sampler 7 under the control of sampling pulses, shown in FIGURE 4E, which are developed within the sampler from the field impulses shown in FIGURE 4D, which form part of the television signal from source 4, thus developing a control voltage dependent upon the magnitude $x$. A second waveform generator 6' develops a recurrent balanced sawtooth pulse, shown at 116 in FIGURE 4C', which is coincident with those field pulses of the signal (FIGURE 4A) from source 1 which do not control the production of the frame sawtooth signal (FIGURE 4B). These sawtooth pulses are also sampled in a second sampler 7' by sampling pulses (FIGURE 4E) identical with those used to control sampler 7 to develop a control voltage. Both control voltages are applied to sync. generator 5 so that their combined effect controls the sync. generator in such a manner as to produce the required phase relation between the synchronizing signal components of the signals from sources 1 and 4.

The embodiment of the invention illustrated by FIGURE 5 differs from that of FIGURE 3 in that the signals from first and second waveform generators 6, 6' are combined and applied to a signal sampler 7, the control signal developed by which is applied to control sync. generator 5. The waveforms appearing in this arrangement are illustrated by FIGURE 6, in which waveform A represents as before the field synchronizing impulses of the signal from source 1, and waveform B the frame sawtooth voltage developed by the first waveform generator 6. Waveform F represents a ramped square-wave voltage developed by the second waveform generator 6', which as will be seen contains recurrent portions such as 120, coincident with the even-line field pulses of waveform A as denoted by vertical broken lines 121, which have a rate of rise higher than that of sawtooth waveform B. Combining waveforms B and F yields a composite sawtooth voltage, represented by waveform G, having two distinct rates of rise. Portions 122 have a lower rate of rise equal to that of sawtooth waveform B, while portion 123 has a higher rate of rise equal to that of portion 120 of waveform B. This composite sawtooth waveform is sampled in sampler 7 under the control of sampling pulses shown by waveform E, which as before are timed by the even-line field pulses of the signal from source 4 (waveform D) to yield a control voltage *z* which is applied to sync. generator 5.

FIGURE 7 shows the waveforms which may appear in an alternative embodiment of the invention using apparatus identical in principal with that described in relation to FIGURE 5. Here, however, the frame sawtooth signal, shown by waveform H, generated by first waveform generator 6 here may have twice the rate of rise required for the portions of lower slope in the composite sawtooth signal, represented by waveform K. With frame sawtooth H is combined a further frame sawtooth signal J, of the opposite polarity and timed by the even-line field pulses instead of by the odd-line pulses. This further sawtooth signal J is of half the amplitude of waveform H, so that when the two are combined the composite signal shown at 7G will be identical in form with that derived as described in relation to FIGURE 6. Apparatus suitable for producing the waveforms H and J of FIGURE 7 may be conventional and is not thought to require detailed description, while the circuit means necessary for combining these sawtooth waveforms to produce the composite signal 7G is also well known.

FIGURE 8 is a schematic diagram illustrating a further embodiment of the invention in which a signal having the waveform illustrated by FIGURE 6G or 7G is developed directly. Here signals from source 1 are applied to a pulse generator 8 which develops separate trains of impulses which are respectively coincident with the odd- and even-line field synchronizing signals of the signal developed by source 1. Both these trains of impulses are applied to a waveform generator 6, which is here arranged to develop on a capacitor a charge which changes uniformly with time over the intervals between successive odd-line field pulses, except during the occurrence of the intervening even-line field impulses, when the rate of change of charge is substantially increased. Apparatus suitable for performing the function of waveform generator 6 is described in detail with reference to FIGURE 9.

The composite waveform developed by waveform generator 6 is applied as before to a sampling circuit 7 in which it is sampled by a pulse developed from the even-line field pulses of the signal from a source 4. The error voltage thus developed is, as before, applied to control the frequency of a synchronizing signal generator 5 forming part of source 4.

It may be pointed out that in all embodiments of the invention signal suorces 1 and 5 may be interchanged without affecting the operation.

The circuit arrangement shown in FIGURE 9 includes an input terminal 30, to which are applied negative-going synchronizing signals derived from the off-field synchronizing signals. These impulses are negative-going; they are applied to a differentiating circuit composed of a capacitor 31 and a resistor 32 so that the negative-going spike resulting at the leading edge of the pulse causes a transistor 33, the base of which is connected to the junction of capacitor 31 and resistor 32, to become momentarily conductive. When transistor 33 becomes conductive it draws current though the primary winding 37 of a transformer 38. When this occurs, a transistor 36, of which the collector-emitter path is connected between the primary winding 37 and the earthed positive terminal of the supply, is caused to become conductive by the negative-going pulse induced in a secondary winding 43 on transformer 38 and applied to the base of transistor 36 by way of a resistor 44. When transistor 36 thus becomes conductive winding 37 of transformer 38 is effectively connected across the supply. As is known, the rate of rise of current in an inductance to which a constant direct voltage is applied is itself constant. This action therefore results in a predetermined rate of rise of current in primary winding 37. The rate of change or rise of this current is limited to a suitable value by the presence of a capacitor 39 in shunt with winding 37. The voltage appearing across feedback winding 43 of transformer 37 is such that transistor 36 is held on. After a period of time which is accurately determined by the design constants of transformers 38 and the supply voltage, the core of the transformer becomes saturated by the increasing flux. When the rate of change of flux in the core thus commences to fall, the voltage produced across winding 43 also falls. This drop in voltage is transferred to the base of transistor 36, which is thus caused to pass less current. As a result, the rate of change of flux in the core of transformer 37 decreases and in fact reverses, and a regenerative action occurs which results in transistor 36 being cut off. The reverse voltage arising when transistor 36 is cut off is limited by a diode 40 to prevent excessive reverse voltages being applied to the transistor. A resistor 41 connected in shunt with the primary winding 37 of transformer 38 is found to be desirable in order to prevent undesired response to spurious voltage impulses which may enter the circuit. A single pulse of some 140 $\mu s$ duration is thus developed by the blocking oscillator for each applied synchronising impulse.

The pulse developed by the blocking oscillator is fed out from a tertiary winding 45 on transformer 38 and applied to a four-diode bridge 46 by way of the parallel combination of a resistor 47 and a capacitor 48 which serves to keep the bridge diodes cut off between the applied pulses and therefore has a time-constant long compared with the frame period. A value of 1.5 seconds has been found convenient for this time-constant. When diode bridge 46 conducts it discharges to the voltage appearing across a parallel combination of capacitor 49 and resistor 50, a capacitor 51 which is continuously charged by way of a known type of constant-current device comprising an n-p-n transistor 52 having its emitter returned to the negative line by way of a resistor and its base held at an appropriate potential by a voltage divider comprising resistors 54, 55, connected from the base of the transistor to the negative and positive supply lines respectively. The base is by-passed to the negative supply line by way of a capacitor 56.

As a result of the operations described above there arises across capacitor 51 a sawtooth voltage waveform having a rate of rise determined by constant-current device 52–56 and a period of one frame duration. To produce the two-rate sawtooth voltage wave required by the invention the arrangements already described are modified as will now be described.

To input terminal 60, shown in the lower part of the diagram, there are applied negative-going impulses derived from the even-field synchronizing signals. These impulses are employed to trigger a blocking oscillator of which the operation is exactly similar to that already described. The circuits contain identical components, the reference numbers of the oscillator now discussed being thirty higher than those of the oscillator already described. A detailed description of the operation will therefore not be repeated. In this case, however, the output pulse from secondary winding 75 of transformer 68 is applied by way of a resistor 76 and a diode 77 to the emitter of the constant-current transistor 52, thus causing it to pass a substantially increased current. With the component values given below the increased rate of rise, which occurs during portion W of waveform 6G, will be some fifty times that which obtains during the remaining portion of the stroke.

The compound sawtooth voltage thus developed across capacitor 51 is fed out by way of an emitter-follower stage comprising a transistor 57 and a resistor 58, the voltage appearing across this latter being fed to an output terminal 59.

The compound sawtooth voltage of waveform 6G which is thus produced is applied to a known form of phase comparator in which it is sampled by a pulse to develop a control voltage varying in amplitude with the phase relation between the sawtooth waveform and the sampling pulse. The arrangement is preferably such that, as is shown in the relations between waveforms 6E and 6G, the trailing edge of the sampling pulse occurs midway in the steeply rising part of the composite sawtooth when the desired phase relation between the compared signals has been produced.

A circuit arrangement suitable for performing this phase comparison is shown in FIGURE 10. Here the compound sawtooth voltage delivered from output terminal 59 of the circuit arrangement shown in FIGURE 9 is applied by way of an input terminal 80 to a four-diode bridge 81, the diagonally opposite terminal of which is connected to a storage capacitor 82, the potential appearing across which is made available at an output terminal 83 as a control voltage. The diodes of bridge 81 are normally biased to the non-conductive condition by reason of a parallel resistor/capacitor combination 84 of appropriately long time-constant connected in the drive circuit. To sample the sawtooth voltage the diodes of the bridge are driven ON by a pulse, shown in FIGURE 6E, which is generated by a sampling pulse generator 85 and applied by way of time-constant circuit 84 across the second diagonal of the diode bridge. The potential on capacitor 82 will thus, in known manner, be brought to the potential of sawtooth voltage waveform 60 which is present at that instant when the sampling pulse 6D ends. If, as indicated in FIGURE 6, it is arranged that the desired phase relation between sampling and sampled signals results in the sampling pulse ending within the duration of the fast portion of the compound sawtooth voltage, then in accordance with the invention the advantages of a stiff phase lock with a wide pull-in range may be obtained.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. Television synchronizing apparatus for producing a predetermined phase relation between two sets of television synchronizing signals, comprising in combination: individual sources of first and second television synchronizing signals comprising horizontal frequency and vertical frequency components and defining alternate odd-line and even-line fields; voltage controlled phasing means varying the relative phases of said signals; sampling means operating to develop a control voltage representing the value of an applied signal at instants fixedly related in time to controlling pulse signals, sawtooth generator means developing in response to an applied synchronizing signal a sawtooth voltage wave repetitive at half the frequency of said vertical synchronizing component and having a predetermined rate of rise; circuit means applying said first vertical synchronizing component to synchronize said sawtooth generator; circuit means applying said sawtooth voltage wave to said sampling means; circuit means applying said second vertical synchronizing component to control said sampling means; and circuit means applying said control voltage to said phasing means.

2. Television synchronizing apparatus for producing a predetermined phase relation between two sets of television synchronizing signals, comprising in combination; individual sources of first and second synchronizing signals including components repetitive at vertical and at horizontal frequency and defining alternate odd-line and even-line fields; voltage-controlled phasing means varying the relative phases of said signals; first pulse generator means generating in response to an applied vertical synchronizing signal first pulses predeterminedly timed with respect to those of said vertical signals preceding odd-line fields; second pulse generator means generating in response to an applied vertical synchronizing signal second pulses predeterminedly timed with respect to those of said vertical signals preceding even-line fields; circuit means applying said first vertical component alike to said first and second pulse generator means; third pulse generator means generating in response to an applied vertical synchronizing signal third pulses predeterminedly timed with respect to those of said vertical signals preceding a predetermined one of said odd-line and even-line fields; first waveform generator means developing in response to applied pulses a sawtooth voltage wave having stroke portions with a first predetermined rate of rise between said pulses and having flyback portions coincident with said pulses; circuit means applying to said first waveform generator those of said first and second pulses timed with respect to vertical pulses preceding the other of said fields; second waveform generator means developing in response to applied pulses a voltage waveform including during said pulses a portion having a second predetermined rate of rise higher than said first rate; circuit means applying to said second waveform generator the remaining ones of said first and second pulses; first and second sampling means developing in response to applied vertical synchronizing signals and voltage waveforms respective first and second control voltages representing the values of said voltage waveforms during the occurrence of those vertical synchronizing signals preceding said predetermined fields; circuit means applying said sawtooth voltage wave to said first sampling means; circuit means applying said voltage wave to said second sampling means; circuit means applying said second synchronizing signals alike to control said first and said second sampling means; and circuit means applying said first and said second control voltages to said phasing means.

3. Television synchronizing apparatus for producing a predetermined phase relation between two sets of television synchronizing signals, comprising in combination: individual sources of first and second synchronizing signals including components repetitive at vertical and at horizontal frequency and defining alternate odd-line and even-line fields; voltage-controlled phasing means varying the relative phases of said signals; first pulse generator means generating in response to an applied vertical synchronizing signal first pulses predeterminedly timed with respect to those of said vertical signals preceding odd-line fields, second pulse generator means generating in response to an applied vertical synchronizing signal second pulses predeterminedly timed with respect to those of said vertical signals preceding even-line fields; circuit means applying said first vertical component alike to said first and second pulse generator means; third pulse generator means generating in response to an applied vertical synchronizing signal third pulses predeterminedly timed with respect to those of said vertical signals preceding a predetermined one of said odd-line and even-line fields; first waveform generator means developing in response to applied pulses first waveform portions of predetermined polarity said waveform portions having a first predetermined rate of rise during the intervals between said pulses; circuit means applying to said first waveform generator those of said first and second pulses timed with respect to vertical pulses preceding the other of said fields; second waveform generator means developing in response to applied pulses waveform portions having during said pulses a second predetermined rate of rise greater than said first rate; circuit means applying to said second waveform generator the remaining ones of said first and second pulses; adder means combining applied signals to form a composite output signal, circuit means applying said first and second waveform portions to said adder; sampling means controlled by applied pulses and by an applied voltage waveform to develop a control voltage representing the value of said applied voltage waveform during the occurrence of said pulses; circuit means applying said composite signal from said adder to said sampling means; circuit means applying said third pulses to control said sampling means and circuit means applying said control voltage to said phasing means.

4. Apparatus as defined in claim 3 in which said second waveform generator means operates to develop in response to said applied pulses a sawtooth voltage waveform comprising flyback portions occurring during said pulses, said flyback portions having said second predetermined rate of rise and comprising stroke portions intervening between the said flyback portions, said stroke portions being opposite in polarity to said first waveform portions.

5. Apparatus as defined in claim 3 in which said second waveform generator means operates to develop in reponse to said applied pulses a voltage waveform having a constant value during intervals between said pulses.

6. Apparatus as defined in claim 3 in which said second waveform generator means operates to develop in response to said applied pulses a voltage waveform having a constant value during intervals between said pulses, said waveform in response to each said pulse changing abruptly from said constant value to a first value differing from said constant value in a predetermined polarity by a first predetermined amount, changing from said first value at said second predetermined rate to a second value differing from said constant value in the polarity opposite to said predetermined polarity by said predetermined amount and changing abruptly from said second value to said constant value.

7. Television synchronizing apparatus for producing a predetermined phase relation between two sets of television synchronizing signals, comprising in combination; individual sources of first and second synchronizing signals including components repetitive at vertical and at horizontal frequency and defining alternate odd-line and even-line fields; voltage-controlled phasing means varying the relative phases of said signals, first pulse generator means generating in response to an applied vertical synchronizing signal first pulses predeterminedly timed with respect to those of said vertical signals preceding odd-line fields; second pulse generator means generating in response to an applied vertical synchronizing signal second pulses predeterminedly timed with respect to those of said vertical signals preceding even-line fields; circuit means applying said first vertical component alike to said first and second pulse generator means; third pulse generator means generating in response to an applied vertical synchronizing signal third pulses predeterminedly timed with respect to those of said vertical signals preceding a predetermined one of said odd-line and even-line fields; waveform generator means developing in response to first and second sets of alternately occurrent pulses a voltage waveform rising generally at a first predetermined rate during the interval between pulses of said first set and rising at a second predetermined rate greater than said first rate in response to pulses of said second set; circuit means applying said first and second pulses to control said waveform generator; sampling means controlled by applied pulses and by an applied voltage waveform to develop a control voltage representing the value of said applied voltage waveform during the occurrence of said pulses; circuit means applying said voltage waveform from said generator to said sampling means; circuit means applying said third pulses to control said sampling means; and circuit means applying said control voltage to said phasing means.

8. Apparatus as defined in claim 7 in which said waveform generator means comprises the combination of; a source of direct current; a capacitor; continuously operative means changing said capacitor from said source at a first predetermined rate; means discharging said capacitor in response to first applied pulses; means changing said capacitor from said source at a second predetermined rate in response to second applied pulses; and means withdrawing said voltage waveform from said capacitor.

9. Apparatus as defined in claim 7 in which said waveform generator means comprises, in combination: blocking oscillator means developing in response to applied pulses voltage pulses of predetermined amplitude and duration; a four-diode switch operable by applied pulses to establish an electric circuit between first and second terminals; a point at earth potential; a parallel combination of a capacitor and a resistor connected from said first terminal to said point at earth potential; a further capacitor connected from said second terminal to said point at earth potential; charging means operable by an applied voltage to pass current at a first or at a second rate; a direct-current source; circuit means connecting said charging means to charge said source; and circuit means deriving said voltage waveform from said further capacitor.

References Cited

UNITED STATES PATENTS 2,752,424 6/1956 Pugsley ------------ 178—69.5

ROBERT L. GRIFFIN, *Primary Examiner.*

R. L. RICHARDSON, *Assistant Examiner.*